United States Patent [19]

Frola

[11] 4,392,193

[45] Jul. 5, 1983

[54] RECTIFYING AND INVERTING APPARATUS

[75] Inventor: Frank V. Frola, Monroeville, Pa.

[73] Assignee: Westinghouse Electric Corp., Pittsburgh, Pa.

[21] Appl. No.: 393,695

[22] Filed: Sep. 1, 1964

[51] Int. Cl.³ .......................................... H02M 7/757
[52] U.S. Cl. .................................... 363/128; 363/136
[58] Field of Search ...................... 321/1, 8, 43, 45, 46, 321/47; 320/21, 56; 318/231; 363/128, 136

[56] References Cited

U.S. PATENT DOCUMENTS

3,085,190 4/1963 Kearns .
3,196,336 7/1965 Schmidt .
3,257,604 6/1966 Colclaser .

FOREIGN PATENT DOCUMENTS

894563 4/1962 United Kingdom .

Primary Examiner—Theodore M. Blum
Attorney, Agent, or Firm—D. R. Lackey

EXEMPLARY CLAIM

1. In an apparatus for transferring electrical energy between a unidirectional potential circuit and an alternating potential circuit, a pair of unidirectional potential busses adapted to be connected to the unidirectional potential circuit, a pair of alternating potential busses adapted to be connected to the alternating potential circuit, a transformer having first and second winding parts, said second winding part having first and second pairs of connections, means connecting said first winding part to said alternating potential busses, first and second separately energized current conducting paths connecting said first pair of connections of said second winding part to said unidirectional potential busses for transfer of energy from said unidirectional busses to said alternating potential busses, said first path when conductive being effective to conduct current between said unidirectional busses in one direction and through a first portion of said second winding part in a first direction to thereby induce a potential of a first polarity in said first winding part, said second path when conductive being effective to conduct current between said unidirectional busses in said one direction and through said first portion of said second winding part in a direction opposite to said first direction to thereby induce a potential of a second polarity in said first winding part, said second polarity being opposite to said first polarity, third and fourth separately energized current conducting paths connecting said second pair of connections of said second winding part to said unidirectional potential busses for transfer of energy from said alternating potential busses to said unidirectional potential busses, said third path when conductive being operable to conduct current between said unidirectional busses in a second direction through a second portion of said second winding part, said fourth path when conductive being operable to conduct current between said unidirectional busses in said second direction through said second portion of said second winding part, the turns of said winding parts being arranged such that the ratio of the turns of said first winding part with respect to the turns of said second winding part which are located between said first connections is greater than the ratio of the turns of said first winding part with respect to the turns of said second winding part which are located between said second connections, and means rendering said first path conductive solely for a first predetermined interval of each first half cycle of current flow through one of said winding parts and thereafter rendering conductive for the remainder of each of first half cycles of said current in said one winding part the one of said third and fourth paths which connects the said second pair of connections for the flow of current from the most positive one of said second pair of connections to the most negative one of said second pair of connections, said last-named means being operable to render said second path conductive solely for a second predetermined interval of each second half cycle of the current flow through said one winding part and thereafter rendering conductive for the remainder of each of said second half cycle of said current in said one winding part the other of said third and fourth paths.

11 Claims, 1 Drawing Figure

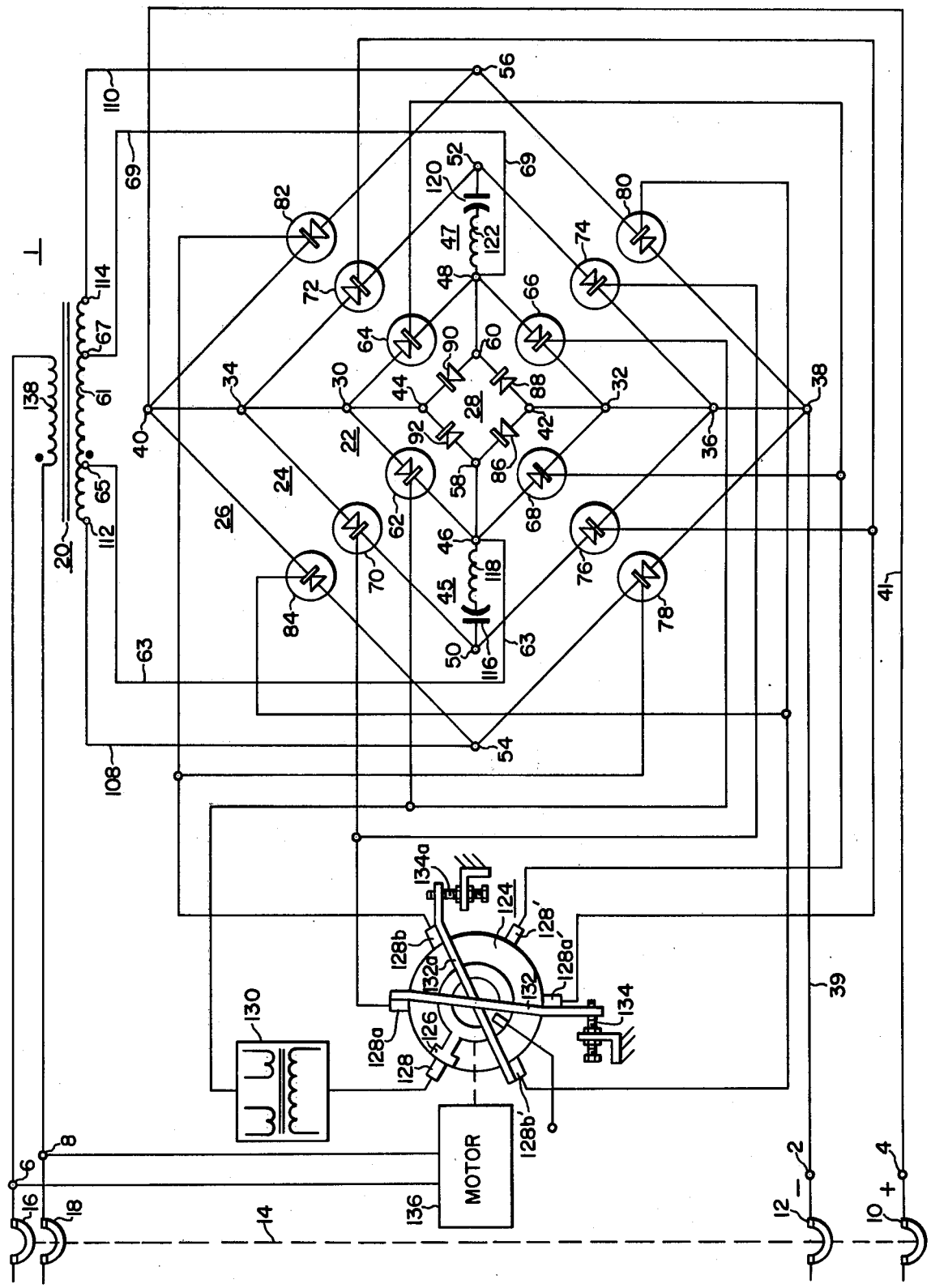

RECTIFYING AND INVERTING APPARATUS

This invention relates generally to apparatus for interchanging electrical energy between alternating and direct current circuits and more particularly to an apparatus for operating as an inverter to invert direct current into alternating current and as a rectifier to convert alternating current into direct current.

An object of this invention is to provide such an apparatus which is transferred from an inverter to a converter and vice versa each half cycle of the alternating electrical quantity.

Another object of this invention is to provide such an apparatus which is easily regulated to determine the relative magnitude and directions of the energy interchanged between an alternating current circuit and a direct current circuit in each direction.

Other objects of the invention will be apparent from the description, the appended claims and the drawing, the sole FIGURE of which illustrates schematically an apparatus embodying the invention.

Referring to the drawing by characters of reference, the numeral 1 represents generally a power transfer apparatus having a pair of unidirectional power terminals 2 and 4 and a pair of alternating potential power terminals 6 and 8. The terminals 2 and 4 are connected to a suitable unidirectional power circuit through the contacts 10 and 12 of a breaker or disconnect switch 14 while the terminals 6 and 8 are connected to an alternating potential circuit through contacts 16 and 18 of the switch 14. The energy is interchanged between the circuits through a transformer 20 under control of a plurality of bridge networks 22, 24, 26 and 28. Each of the bridge networks is provided with a first pair of terminals 30–32, 34–36, 38–40 and 42–44 which are connected by conductors 39 and 41 to the unidirectional power terminals 2 and 4. The networks 22, 26 and 28 are provided with a second pair of terminals 46–48, 54–56 and 58–60 which are connected to the multi-tapped winding 61 of the transformer 20. The second pair of terminals 50 and 52 of the network 24 are connected to the terminals 46 and 48 of the network 22 through reactive means 45 and 47 respectively for terminating current flow in the network 22.

The bridge network 22 controls the flow of energy from the unidirectional potential circuit to the alternating potential circuit and comprises two conducting paths. The first path permits energy to flow from the unidirectional potential circiut through the transformer 20 into the alternating potential circuit during one-half cycle of the alternating quantity and the second path permits the flow of energy between the same circuits during the other half cycle of the alternating quantity. The first path extends from the terminal 30 through the anode-cathode circuit of a suitable valve device such as a silicon controlled rectifier 62, terminal 46, conductor 63, the portions of the winding 61 between the terminals 65 and 67 of the winding 61, conductor 69, the terminal 48, the anode-cathode circuit of a suitable valve 66, which likewise may be a silicon controlled rectifier, to the terminal 32. The second path extends from the terminal 30 through the anode-cathode circuit of a suitable valve device 64, such as a silicon controlled rectifier, terminal 48, conductor 69, the portion of the winding 61 between terminals 67 and 65, conductor 63, the terminal 46, the anode-cathode circuit of a suitable valve device 68, such as a silicon controlled rectifier, to the terminal 32.

The other bridge networks 24 and 26 are similarly constructed and include control valves 70, 72, 74 and 76 and control valves 78, 80, 82 and 84, respectively, which may likewise be silicon controlled rectifiers. The bridge network 28, unlike the other three networks, utilizes diodes 86, 88, 90 and 92 for control valves and, as will be pointed out below, act to conduct reactive current flow from the alternating potential circuit to the direct potential circuit during the intervals between the termination of energy flow in the bridge network 22 and the initiation of energy flow in the bridge network 26.

The terminals 58 and 60 of the bridge network 28 are connected to the conductors 63 and 69 respectively and thereby to the winding terminals 65 and 67. The bridge terminals 54 and 56 are connected by conductors 108 and 110 to outer terminals 112 and 114 of the winding 61 and is utilized to permit the flow of energy through the transformer 20 from the alternating potential circuit to the direct potential circuit.

The valves of the networks 22, 24 and 26, which are of the thyratronic type whereby once they have been rendered conducting they will continue to conduct until the current flow therethrough is interrupted by external means, are rendered conducting in predetermined sequence by a suitable means such as the rotating commutator 124 driven by the synchronous motor 136. The commutator 124 is provided with a rotating contact 126 which sequentially engages a plurality of fixed contacts 128, 128a, 128b, 128′, 128a′ and 128b′ to energize the same from a suitable potential source, not shown.

The details of the pulse producing circuits for firing the thyratronic valves of the networks are well known and are shown herein in diagrammatic single line diagram for the purpose of simplifying the drawing. It will, however, be apparent that when the rotating contact 126 engages a fixed contact, for example contact 128, the gates of the associated valves 62 and 66 will be pulsed to render the anode-cathode circuits thereof conducting. As illustrated, the output pulse of the commutator may energize the primary winding of a transformer 130. In this instance, the pair of secondary windings would be connected respectively between the gate and cathode of the two controlled rectifiers 62 and 66 as shown by the single line diagram.

In order that the conductive periods of the bridges 22 and 26 may be controlled, the fixed contacts 128a and 128a′ may be carried by a movable support 132 adjustably positioned with respect to the contacts 128 and 128′ by means of the set screw 134. The third set of fixed contacts 128b and 128b′ may be carried by a movable support 132a which is adjustably positioned by means of a set screw 134a.

It is believed that the remainder of the details of construction may best be described by a description of operation of the apparatus which is as follows; Assuming that the disconnect switch 14 is closed, to connect the alternating and direct current circuits to the alternating and direct current power terminals 6-8 and 2-4 respectively, and an instant of time in which the synchronous motor is positioning the commutator 124 in the position as illustrated in the drawing, engagement of the rotating contact 126 with the fixed contact 128 causes the controlled rectifiers 62 and 66 to be pulsed into a conducting condition. This causes current to flow from the positive direct current terminal 4 through conductor 41, terminal 30, anode to cathode of the controlled rectifier 62, terminal 46, conductor 63, the portion of the winding 61 intermediate the terminals 65 and 67, conductor 69, controlled rectifier 66, terminal 32 and conductor 39 to the negative direct potential power terminal 2. The current flow through this portion of the winding 61 induces flux in the winding 138 in a direction to energize the output terminal 8 positively with respect to the output terminal 6, as indicated by the conventional dots on the windings 61 and 138. Electrical energy will flow from the unidirectional potential circuit to the alternating potential circuit.

At a predetermined later time, as determined by the setting of the support 132, these conducting valves 62 and 66 are extinguished. This is accomplished when the movable contact 126 engages the fixed contact 128a to pulse the controlled rectifiers 70 and 74 into a conducting condition. When rendered conductive, the valves 70 and 74 cause charging current to flow to the capacitors 116 and 120 through the inductance 118 and 122, respectively, of the networks 45 and 47. This current flow renders the cathodes of the controlled rectifiers or valves 62 and 66 positive with respect to their anodes thereby terminating their conduction. The controlled rectifiers 70 and 74 will terminate their conduction when the capacitors 116 and 120 receive a predetermined critical charge. When the controlled rectifiers 62 and 66 cease to conduct, reactive current from the transformer winding 61 will flow through the diodes 86 and 90, whereby reactive power will be transferred back to the direct potential circuit. It will be noted that the transfer of this reactive power is at the same voltage level as determined by the portion of the winding 61 between the terminals 65 and 67.

At subsequent later time, the movable contact 126 will engage the contact 128b to pulse the gates of the controlled rectifiers 78 and 82 whereby they are rendered conducting. These controlled rectifiers 78 and 82 conduct current in the same relative direction between the transformer 20 and the unidirectional potential source as do the diodes 90 and 86 but the potential of the energy is stepped up by the greater number of turns of the winding 61. In the illustrated instance the entire winding 61 is utilized. Electrical energy therefore flows from the alternating potential circuit through the transformer 20 and the bridge network 26 to the unipotential circuit. Providing the alternating circuit has enough energy, this flow will continue until such time as the current flow through the controlled rectifiers 78 and 82 terminates due to the alternation of the potential of the alternating potenital circuit.

The following half cycle is initiated when the movable contact 126 engages the fixed contact 128' to render the controlled rectifiers 64 and 68 of the bridge network 22 conducting. When this occurs, current will flow from the positive terminal 4 through the conductor 41, the valve or controlled rectifier 64, the conductor 69, the portion of the winding 61 intermediate the terminals 67 and 65, the conductor 63, the controlled rectifier 68 and conductor 39 to the negative terminal 2. This current flow is in the opposite direction whereby the winding 138 is energized to render the alternating current terminal 6 positive with respect to the alternating current terminal 8 and energy will flow from the unidirectional potential circuit to the alternating potential circuit.

As described above in connection with the first half cycle operation, engagement of the rotating contact 126 with the fixed contact 128' pulses the controlled rectifiers 72 and 76 of the bridge network 24 conducting to terminate further conduction of the controlled rectifiers 64 and 68 substantially as described above with respect to the termination of conduction of the rectifiers 62 and 66. In this case, however, current flow through the networks 45 and 47 is in the opposite direction to that which occurred when the controlled rectifiers 62 and 66 were extinguished. When the rectifiers 64 and 68 terminate their conduction reactive current will flow through the diodes 88 and 92 of the bridge network 28 until such time as the reactive energy has been reduced sufficiently or until the rotating contact 126 engages the fixed contact 128b' and the controlled rectifiers 80 and 84 are rendered conducting to cause energy to flow from the alternating potential circuit to the unidirectional potential circuit. This energy flows substantially as described above until the alternating potential causes the controlled rectifiers 80 and 84 to cease to conduct. The operation just described will be repeated each revolution of the commutator 124.

By adjusting the set screws 134 and 134a, the relative intervals during which the networks 22 and 26 are conductive may be controlled to determine the amount of power transferred from the unidirectional potential circuit to the alternating potential circuit or vice versa. By maintaining the bridge network 26 conductive for longer intervals than the network 22, the apparatus will become predominantly a converter and predominantly an inverter when the network 22 is conductive for intervals longer than those during which the network 26 is conductive.

Although the invention has been described with reference to a single embodiment thereof, numerous modifications are possible and it is desired to cover all modification falling within the spirit and scope of the invention.

What is claimed and is desired to be secured by United States Letters Patent is as follows:

1. In an apparatus for transferring electrical energy between a unidirectional potential circuit and an alternating potential circuit, a pair of unidirectional potential busses adapted to be connected to the unidirectional potential circuit, a pair of alternating potential busses adapted to be connected to the alternating potential circuit, a transformer having first and second winding parts, said second winding part having first and second pairs of connections, means connecting said first winding part to said alternating potential busses, first and second separately energized current conducting paths connecting said first pair of connections of said second winding part to said unidirectional potential busses for transfer of energy from said unidirectional busses to said alternating potential busses, said first path when conductive being effective to conduct current between said unidirectional busses in one direction and through a first portion of said second winding part in a first direction to thereby induce a potential of a first polarity in said first winding part, said second path when conductive being effective to conduct current between said unidirectional busses in said one direction and through said first portion of said second winding part in a direction opposite to said first direction to thereby induce a potential of a second polarity in said first winding part, said second polarity being opposite to said first polarity, third and fourth separately energized current conducting paths connecting said second pair of connections of said second winding part to said unidirectional potential busses for transfer of energy from said alternating potential busses to said unidirectional potential busses, said third path when conductive being operable to conduct current between said unidirectional busses in a second direction through a second portion of said second winding part, said fourth path when conductive being operable to conduct current between said unidirectional busses in said second direction through said second portion of said second winding part, the turns of said winding parts being arranged such that the ratio of the turns of said first winding part with respect to the turns of said second winding part which are located between said first connections is greater than the ratio of the turns of said first winding part with respect to the turns of said second winding part which are located between said second connections, and means rendering said first path conductive solely for a first predetermined interval of each first half cycle of current flow through one of said winding parts and thereafter rendering conductive for the remainder of each of first half cycles of said current in said one winding part the one of said third and fourth paths which connects the said second pair of connections for the flow of current from the most positive one of said second pair of connections to the most negative one of said second pair of connections, said last-named means being operable to render said second path conductive solely for a second predetermined interval of each second half cycle of the current flow through said one winding part and thereafter rendering conductive for the remainder of each of said second half cycle of said current in said one winding part the other of said third and fourth paths.

2. The combination of claim 1 in which said first predetermined interval is equal in duration to said second predetermined interval and said paths include at least one valve device for controlling at least the initiation of current flow therethrough.

3. The combination of claim 2 in which a fifth and sixth current path interconnecting said first pair of connections with said unidirectional potential busses, and diode device in said fifth and sixth paths to permit flow of electrical energy solely from said first pair of connections to said unidirectional busses at said first and said second polarities of said first winding part.

4. The combination of claim 3 in which said valve devices are of the thyratronic type, there is provided means to render said thyratronic valve devices associated with said first and second paths nonconducting at the end of said first and second predetermined intervals respectively.

5. An apparatus for transferring electrical energy between a unidirectional potential circuit and an alternating potential circuit comprising; unidirectional power terminals adapted to be connected to a unidirectional potential circuit; alternating power terminals adapted to be connected to an alternating potential circuit; a transformer having first and second windings; said second winding having two end terminals and two intermediate terminals located intermediate said end terminals with a first terminal of said intermediate terminals being intermediate the second terminal of said intermediate terminals and a first terminal of said end terminals; a plurality of bridge networks; each said network having first and second pairs of terminals and a plurality of current conducting paths, a first of said paths connecting a first terminal of said first pair of terminals to one terminal of said second pair of terminals, a second of said paths connecting said first terminal of said first pair of terminals to the other terminal of said second pair of terminals, a third of said paths connecting said other terminal to said second terminal and a fourth of said paths connecting said one terminal to said second terminal, each said path including an electronic valve controlling its current conducting condition, said first and second paths and the said valves included therein being arranged such that current flow therethrough is from said first terminal to said second pair of terminals, said third and said fourth paths and the said valves included therein being arranged such that current flow therethrough is from said second pair of terminals to said second terminal; means connecting said first terminal of a first and of a second of said bridge networks to one of said unidirectional power terminals; means connecting said second terminal of said first and of said second bridge networks to the other of said unidirectional power terminals; means connecting said one terminal of said first bridge network to said first intermediat terminal; means connecting said other terminal of said first bridge network to said second intermediate terminal; first and second energy storage devices; means connecting said one terminal of said first bridge network said one terminal of said second bridge network and including said first storage device; means including connecting said other terminal of said first network to said other terminal of said second network and including said second storage device; means connecting said first terminal of a third and a fourth of said bridge networks to said other unidirectional power terminal; means connecting said second terminal of said third and fourth bridge network to said one unidirectional power terminal; means connecting said one terminal of said third bridge network to said first end terminal; means connecting said other terminal of said third bridge network to the second of said end terminals; means connecting together said one terminal of said first and fourth bridge networks, means connecting together said other terminals of said first and fourth bridge networks; and means for rendering conductive said valves of said first and third paths of said first bridge network and thereafter said valves of said first and third paths of said second bridge network and thereafter said valves of said first and third paths of said third bridge network and thereafter said valves of said second and fourth paths of said first bridge network and thereafter said valves of said second and fourth paths of said second bridge network and thereafter said valves of said second and fourth paths of said third bridge network; said valves of said paths of said first and said second and said third bridge networks being thyratronic type valves and said valves of said fourth bridge network being diodes; and circuit means connecting said first winding to said alternating power terminals.

6. In combination a unidirectional potential circuit having power terminals, an alternating potential circuit having power terminals, a transformer having first and second windings, said second winding having two end terminals and two intermediate terminals located intermediate said end terminals with a first terminal of said intermediate terminals being intermediate the second terminal of said intermediate terminals and a first terminal of said end terminals, a plurality of bridge networks each said network having first and second pairs of terminals and first and second and third and fourth current conducting paths, said first and said second paths of each said network respectively and individually connecting a first terminal of its said first pair of terminals to one and the other terminal of its said second pair of terminals, said third and said fourth paths of each said bridge network individually and respectively connecting the second of its said first pair of terminals to said other terminal and said one terminal of its said second pair of terminals, each said path including an electronic valve controlling its current conducting condition, said paths and said valve of each said bridge networks being arranged such that current flow is from its said first terminal to its said second pair of terminals and from its said second pair of terminals to its said second terminal, means connecting said first terminals of a first and a second of said bridge networks and said second terminals of a third and a fourth of said bridge networks to one of said unidirectional power terminals, means connecting said second terminals of said first and second bridge networks and said first terminals of said third and said fourth bridge network to the other of said unidirectional power terminals, means connecting said one terminal of said first bridge network to said first intermediate terminal, means connecting said other terminal of said first bridge network to said second intermediate terminal, first and second capacitive impedance devices, first and second inductive impedance devices, means connecting said one terminal of said first network said one terminal of said second bridge network and including in series circuit said first impedance devices, means connecting said other terminal of said first network to said other terminal of said second network and including in series circuit said second impedance devices, means connecting said one terminal of said third bridge network to said first end terminal, means connecting said other terminal of said third bridge network to the second of said end terminals, means connecting together said one terminal of said first and fourth bridge networks, means connecting together said other terminals of said first and fourth bridge networks, and means rendering said first and said third paths of said first and thereafter of said second and thereafter of said third bridge networks conductive and thereafter rendering said second and said fourth paths of said first and thereafter said second and thereafter said third bridge networks conductive, said valves of first and second and third bridge networks being thyratronic type valves and said valves of said fourth bridge network being diodes, and circuit means connecting said first winding to said alternating power terminals.

7. An apparatus for transferring electrical energy between a unidirectional potential circuit and an alternating potential circuit comprising, unidirectional power terminals adapted to be connected to a unidirectional potential circuit, alternating power terminals adapted to be connected to an alternating potential circuit, a transformer having first and second windings, said second windings having two end terminals and two intermediate terminals located intermediate said end terminals with a first terminal of said intermediate terminals being intermediate the second terminal of said intermediate terminals and a first terminal of said end terminals, a plurality of bridge networks, each said network having first and second pairs of terminals and a plurality of current conducting paths, a first and a second of said paths of each said network individually and respectively connecting a first terminal of its said first pair of terminals to one and the other terminal of its said second pair of terminals, a third and a fourth of said paths of each said network individually and respectively connecting said one terminal and said other terminal of its said second pair of terminals to the second terminal of its said first pair of terminals, each said path including an electronic valve controlling its current conducting condition, said paths and said valves of each said bridge networks being arranged such that current flow is from said first terminal to said second pair of terminals and from said second pair of terminals to said second terminal, means connecting said first terminal of a first of said bridge networks and said second terminal of a second of said networks to one of said unidirectional power terminals, means connecting said second terminal of said first bridge network and said first terminal of said second bridge network to the other of said unidirectional power terminals, means connecting said one terminal of said first bridge network to said first intermediate terminal, means connecting said other terminal of said first bridge network to said second intermediate terminal, means connecting said one terminal of said second bridge network to said first end terminal, means connecting said other terminal of said second bridge network to the second of said end terminals, and means rendering said first and third paths of said first network conductive and thereafter said first and third paths of said second network and thereafter said second and fourth paths of said first network and thereafter said second and fourth paths of said second network, and circuit means connecting said first winding to said alternating power terminals.

8. In an apparatus for transferring energy between a unidirectional potential circuit and alternating potential circuit, a pair of unidirectional potential busses adapted to be connected to the unidirectional potential circuit, a pair of alternating potential busses adapted to be connected to the alternating potential circuit, a transformer having first and second winding parts, said second winding part having first and second pairs of connections, means connecting said first winding part to said alternating potential busses, first and second separately energized current conducting paths connecting said first pair of connections of said second winding part to said unidirectional potential busses for transfer of energy from said unidirectional busses to said alternating potential busses, said first path when conductive being effective to conduct current between said unidirectional busses in one direction and through a first portion of said second winding part in a first direction to thereby induce a potential in said first winding part from energy furnished from said pair of unidirectional potential busses, said second path when conductive being operable to conduct current between said unidirectional potential busses in a direction opposite to said one direction and through a second portion of said second winding part in a given direction from energy furnished said first winding part from said pair of alternating busses, the turns of said winding parts being arranged such that the ratio of the turns of said first winding part with respect to the turns of said second winding part which are located between said first connections is greater than the ratio of the turns of said first winding part with respect to the turns of said second winding part which are located between said connections, and control means rendering solely one of said paths conductive at any given interval, said control means being effective to render said first path conductive solely during intervals in which said first polarity is to be established in said first winding portion and said second path conductive solely during intervals in which said first polarity is established in said first winding part.

9. In an apparatus for transferring energy between a unidirectional potential circuit and alternating potential circuit, a pair of unidirectional potential busses adapted to be connected to the unidirectional potential circuit, a pair of alternating potential busses adapted to be connected to the alternating potential circuit, a transformer having first and second winding parts, said second winding part having first and second pairs of connections, means connecting said first winding part to said alternating potential busses, first and second separately energized current conducting paths connecting said first pair of connections of said second winding part to said unidirectional potential busses for transfer of energy from said unidirectional busses to said alternating potential busses, said first path when conductive being effective to conduct current between said unidirectional busses in one direction and through a first portion of said second winding part in a first direction to thereby induce a potential in said first winding part from energy furnished from said pair of unidirectional potential busses, said second path when conductive being operable to conduct current between said unidirectional potential busses in a direction opposite to said one direction and through a second portion of said second winding part in a given direction from energy furnished said first winding part from said pair of alternating busses, and control means rendering solely one of said paths conductive at any given interval, said control means being effective to render said first path conductive solely during intervals in which said first polarity is to be established in said first winding portion and said second path conductive solely during intervals in which said first polarity is established in said first winding part.

10. In an apparatus for transferring electrical energy between a unidirectional potential circuit and an alternating potential circuit, a pair of unidirectional potential busses adapted to be connected to the unidirectional potential circuit, a pair of alternating potential busses adapted to be connected to the alternating potential circuit, a transformer having first and second winding parts, said second winding part having first and second pairs of connections, means connecting said first winding part to said alternating potential busses, first and second separately energized current conducting paths connecting said first pair of connections of said second winding part to said unidirectional potential busses for transfer of energy from said unidirectional busses to said alternating potential busses, said first path when conductive being effective to conduct current between said unidirectional busses in one direction and through a first portion of said second winding part in a first direction to thereby induce a potential of a first polarity in said first winding part, said second path when conductive being effective to conduct current between said unidirectional busses in said one direction and through said first portion of said second winding part in a direction opposite to said one direction to thereby induce a potential of a second polarity in said first winding part, said second polarity being opposite to said first polarity, third and fourth separately energized current conducting paths connecting said second pair of connections of said second winding part to said unidirectional potential busses for transfer of energy from said alternating potential busses to said unidirectional potential busses, said third path when conductive being operable to conduct current between said unidirectional busses in a second direction and through a second portion of said second winding part in a given direction when said first winding part is energized at its said first polarity, said fourth path when conductive being operable to conduct current between said unidirectional busses in said second direction and through said second portion of said second winding part in a direction opposite to said given direction whereby said first winding part is energized at its said second polarity, and control means rendering solely one of said paths conductive at any given interval, said control means being effective to render said first path conductive solely during intervals in which said first polarity is to be established in said first winding part from said unidirectional potential busses and said third path conductive solely during intervals in which said first winding part maintains said second pair of connections at a given polarity relative for the flow of current therethrough, said control means being effective to render said second path conductive solely during intervals in which said second polarity is to be established in said first winding part from said unidirectional potential busses and said fourth path conductive solely during intervals in which said first winding part maintains said second pair of connections at a relative polarity opposite to said given relative polarity for the flow of current therethrough.

11. The combination of claim 10 in which the turns of said winding parts are arranged such that the ratio of the turns of said first winding part with respect to the turns of said second winding part which are located between said first connections is greater than the ratio of the turns of said first winding part with respect to the turns of said second winding part which are located between said second connections.

* * * * *